United States Patent [19]

Bolo, III

[11] Patent Number: 5,211,134
[45] Date of Patent: May 18, 1993

[54] COLLAPSIBLE, DISPOSABLE LITTER BOX

[76] Inventor: Robert T. Bolo, III, 40 Mulberry St. Apt. 3F, New York, N.Y. 10013

[21] Appl. No.: 842,066

[22] Filed: Feb. 26, 1992

Related U.S. Application Data

[63] Continuation-in-part of Ser. No. 586,241, Sep. 21, 1990, abandoned.

[51] Int. Cl.⁵ ............................................. A01K 67/00
[52] U.S. Cl. ..................................... 119/168; 229/103
[58] Field of Search ................. 119/165, 168, 170, 19; 229/103, 122; 206/45.21, 45.23

[56] References Cited

U.S. PATENT DOCUMENTS

| | | | |
|---|---|---|---|
| 3,581,708 | 6/1971 | Beck | 119/19 |
| 3,581,977 | 6/1971 | Kirsky et al. | 119/168 |
| 4,009,820 | 3/1977 | Fitzgerald | 229/122 |
| 4,348,982 | 9/1982 | Selby | 119/168 |
| 4,776,300 | 10/1988 | Braddock | 119/168 |
| 4,792,082 | 12/1988 | Williamson | 119/168 |
| 4,800,842 | 1/1989 | Jones, Jr. | 119/168 |
| 4,807,808 | 2/1989 | Reed | 229/103 |
| 4,884,527 | 12/1989 | Skirvin | 119/168 |
| 4,940,016 | 7/1990 | Heath | 119/168 |

FOREIGN PATENT DOCUMENTS

| | | | |
|---|---|---|---|
| 3332585 | 3/1985 | Fed. Rep. of Germany | 119/169 |
| 2222942 | 10/1974 | France | 119/168 |

*Primary Examiner*—Gene Mancene
*Assistant Examiner*—Todd E. Manahan
*Attorney, Agent, or Firm*—Gifford, Groh, Sprinkle, Patmore and Anderson

[57] ABSTRACT

A foldable litter box which is convertible from a closed position to an open position to form an enclosed receptacle, includes a base, side walls extending from the base, and end walls also extending from the base and perpendicular to the side walls. The side walls and end walls are connected along common boundaries. Diagonal folding axes are provided on the end walls and on at least one side wall to permit the box to convert from the closed to the open position. A top portion extends from one of the side walls to cover the opening at the top of the receptacle in an overlaying manner. The top may be provided with additional panels to form either a flat or a peaked roof. An aperture is further formed in at least one of the side walls or end walls for permitting access to within the receptacle.

24 Claims, 2 Drawing Sheets

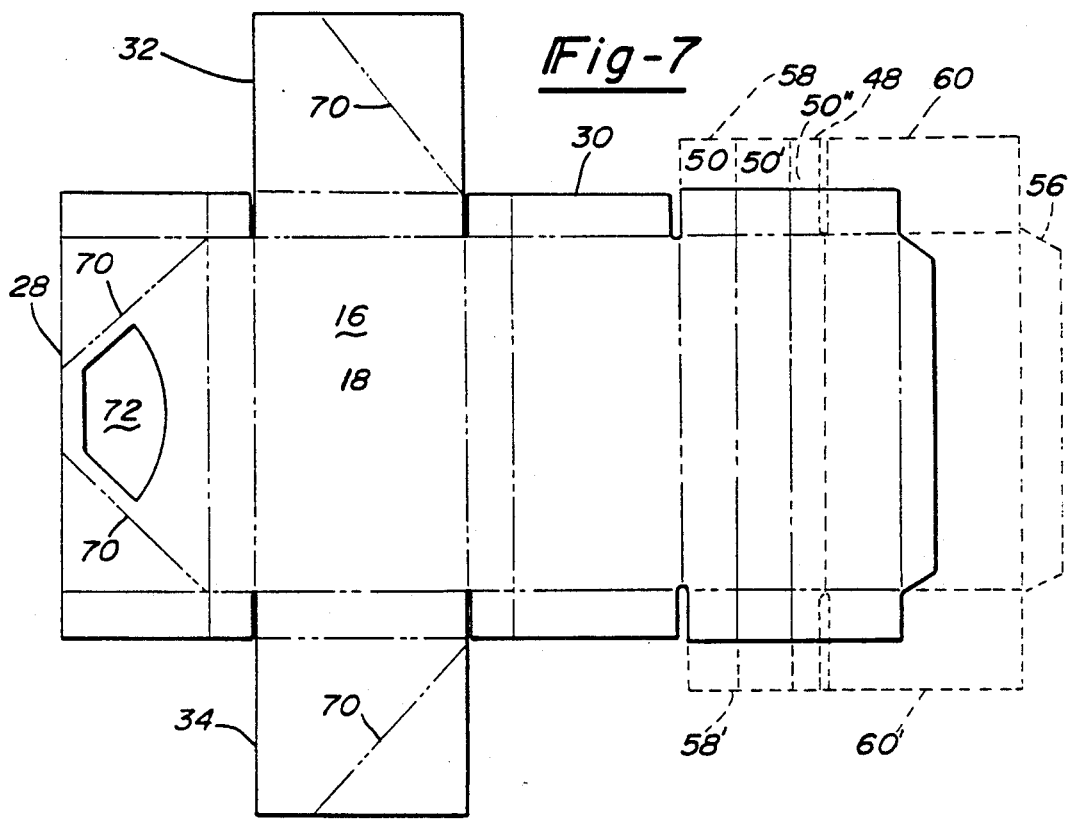
Fig-7
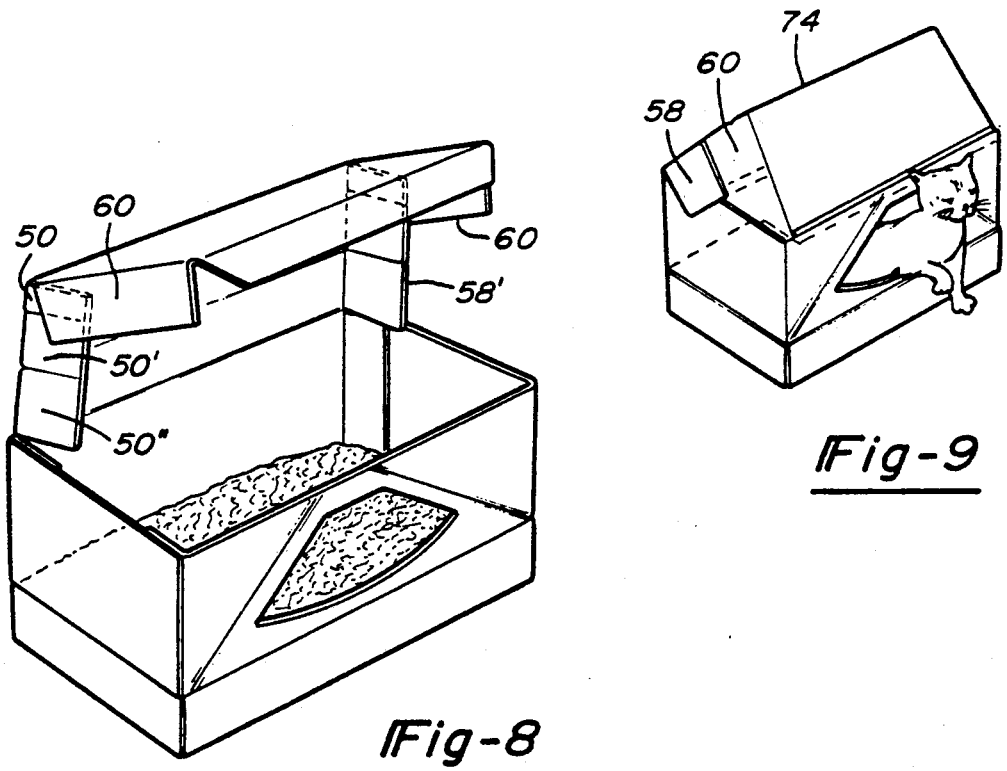
Fig-8
Fig-9

COLLAPSIBLE, DISPOSABLE LITTER BOX

The present application is a continuation-in-part application of Ser. No. 07/586,241, filed Sep. 21, 1990, now abandon.

BACKGROUND OF THE INVENTION

I. Field of the Invention

The present invention relates to litter boxes. More particularly, the present invention relates to a litter box that is convertible from a closed configuration for transportation and disposal to an enclosed receptable for use by an animal.

II. Description of the Prior Art

Disposable cat litter boxes that are convertible from a closed, compact configuration for the storage and transport of cat litter and which expand to a fully enclosed configuration for use are well known in the art. The advantages of disposable litter boxes over traditional open and enclosed non-disposable cat litter boxes constructed of rubber or plastic are well-documented. However, existing cat litter boxes of the disposable, convertible enclosed type do not adequately address various issues pertaining to the containment of litter, fecal matter, and urine in the box during use. Other shortcomings include the box's structural integrity, ease of operation, the cat's health and well-being, recycling and environmental issues.

U.S. Pat. Nos. 4,940,016, 4,792,082, 4,884,527, and 3,581,708 issued to Heath, Williamson, Skirvin (FIGS. 4 and 5 only), and Beck, respectively, disclose litter box assemblies in which the side walls and end walls are not connected in their collapsed state. Rather, the walls are connected through a series of tabs and slots in their erect and enclosed configurations. This type of construction is not as sound as the embodiment in which the side walls and end walls are connected along permanent boundaries. Cats often urinate on the interior walls of enclosed cat litter boxes; and this urine, if directed at the interior corners, could leak through the junctures that are held together by the tabs and slots. Cats are also active within their litter boxes; they dig, bury, kick, and scrape within the box. These activities could also disengage the tabs and slots thus allowing litter, fecal matter, and urine to escape through any gaps in the junctures between the side walls and the end walls.

Another disadvantage to these tab and slot embodiments is that, because the side walls and end walls are not connected in their collapsed state, their interconnection requires coordinating the juncture of the side walls and end walls with a multiplicity of tabs and slots, a difficult feat for one set of hands. These operations must be performed initially to erect the box and also during maintenance of the box since the interior must be accessed daily.

Also, the routine maintenance of the cat litter box has not been fully addressed in the Williamson, Skirvin (FIGS. 1 and 3, and Beck references: nor is it addressed in U.S. Pat. Nos. 4,776,300 and 4,800,842, issued to Braddock and Jones, Jr., respectively. Cat care authorities, veterinarians and cat litter manufacturers all strongly recommend that to ensure a cat's health and well-being, fecal matter must be scooped from the litter box daily. Cats are fastidious, and if fecal matter is allowed to accumulate in a litter box over several days, they may rebel and defecate and/or urinate other than in the litter box. Also, parasites reside and proliferate in the fecal matter, and can create an unhealthy environment inside the litter box which in multi-cat households can cause the transference of disease from one cat to another.

Also, even in enclosed cat litter boxes, the regular removal of fecal matter from a disposable cat litter box will extend the duration of its useful life since an excessive buildup of fecal matter can be odiferous. The Skirvin (FIGS. 1 and 3), Beck, Braddock, Williamson, and Jones, Jr. references all disclose litter boxes in which the interiors cannot be easily accessed by pet owners for daily cleaning.

Finally, none of the prior art of record adequately covers environmental and recycling issues. Skirvin, Heath, Williamson, Braddock Beck, and Jones, Jr. all disclose embodiments of cardboard or boxboard that are collapsed and disposed of with the intent of keeping the expired litter and any fecal matter within the enclosure. Recycling laws that are becoming mandatory throughout the country will require that enclosures of this type be recycled. This would require that any such material or object be empty of any foreign matter and compacted. While the litter and fecal matter of the above-mentioned disposable litter boxes could be emptied through entrance portals, ventilation holes or such, none of the apertures were designed for such a function, and, as a result, are imprecise and unwielding, quite possibly resulting in the spillage of contaminated litter and fecal matter during its removal from the disposable box. Other designs require that the box be partially disassembled in order to remove litter and fecal matter. This required step, in addition to its being unwielding and imprecise, also can cause the pet owner to come into contact with contaminated interior surfaces of the litter box.

SUMMARY OF THE PRESENT INVENTION

The present invention provides a litter box which overcomes the disadvantages of the previously known litter boxes.

The litter box of the present invention is formed of one-piece construction and is totally disposable.

The present invention is prepackaged in a box-like form and is provided with waste absorbent material.

In use, the pet owner simply unseals the litter box for use by the pet. The box unfolds into an enclosed receptacle having a base, side walls and end walls and a top. The side walls and end walls are connected along common boundaries. The base of the litter box is prefilled with the waste absorbent material, thereby eliminating any handling by the pet owner.

One side of the litter box is provided with an entrance portal. The litter box is also provided with a top that effortlessly opens and closes. This allows the pet owner easy access to the interior of the box to remove the pet's feces daily. This helps keep the litter box relatively clean and odor free for the duration of its use.

Once the quality of the waste absorbent material has expired, the pet owner simply refolds the litter box into its closed position and disposes the whole box.

The litter box may also be recycled. The box may be provided with an aperture in the form of a flap located on one side of the base of the litter box. With the litter box in the closed position, the aperture may be opened and the waste material disposed of easily and neatly. The litter box may then be properly recycled as the waste material is no longer present within the box.

This litter box allows waste absorbent material to be packaged for sale, transported, used and disposed of via one container. This serves to eliminate much of the handling and cleaning that pet owners are burdened with in maintaining litter boxes.

Another advantage of the present invention is that the litter box alleviates the burden of transporting the pet's litter materials with the animal when travelling.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which:

FIG. 7 is a flat, two-dimensional view illustrating the mold blank of the present invention and showing a second preferred embodiment in phantom in addition to the first preferred embodiment;

FIG. 8 is a sectional view similar to the perspective view in FIG. 4 and showing the second preferred embodiment of the present invention in which the top panel forms a peak over the side walls and end walls; and FIG. 9 is a view similar to that shown in FIG. 8 and showing the top of the second preferred embodiment in an overlying position.

DETAILED DESCRIPTION OF THE PREFERRED EMBODIMENT OF THE PRESENT INVENTION

Figure 1:
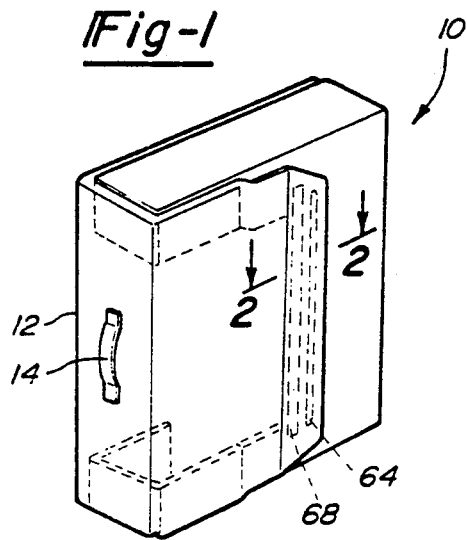
FIG. 1 is a perspective view illustrating a preferred embodiment of the present invention in a packaged condition.

With reference first to FIG. 1, the litter box 10 of the present invention is thereshown in a closed position 12. The litter box 10 displays a substantially rectangular configuration when in the closed position 12. The litter box 10 is preferably constructed of a durable cardboard or other suitable material. A handle 14 may be provided for ease in transport of the litter box when in the closed 12 or packaged condition.

Figure 3:
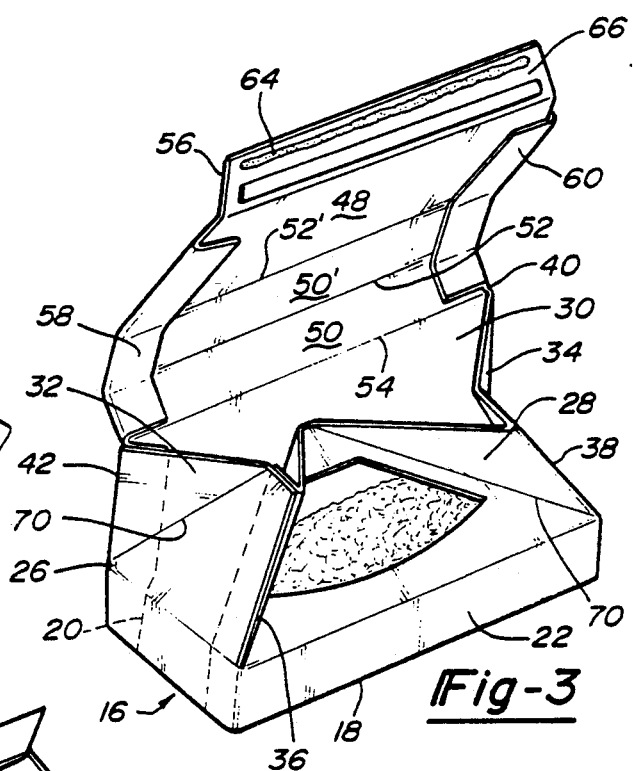
FIG. 3 is a perspective view illustrating a preferred embodiment of the present invention in a partially opened position.
Figure 4:
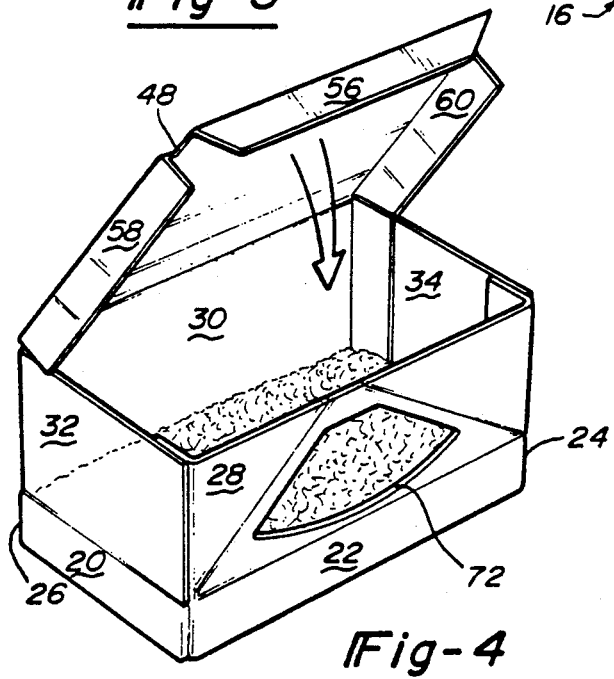
FIG. 4 is a perspective view similar to that shown in FIG. 3 and showing the manner in which the top panel is secured over the side walls and end walls.

Referring further to FIGS. 3 and 4, a first preferred embodiment of the litter box 10 includes a base 16. The base 16 is also of a substantially rectangular shape and has a bottom 18 and four sides 20, 22, 24 and 26. From the base 16 extends side walls 28 and 30 and end walls 32 and 34 in alternating fashion. The side walls 28 and 30 and end walls 32 and 34 are permanently connected along their edges 36, 38, 40 and 42 and are of substantially equal height. In FIG. 3, the litter box 10 is in a semi-expanded state, whereas in FIG. 4 the box 10 is in a fully expanded state.

Referring again to FIG. 4, a top 48 is provided. The top 48 extends in an overlying manner over the side walls 28 and 30 and end walls 32 and 34 of the litter box 10 upon the side walls and end walls being expanded from the semi-expanded to the fully expanded position.

Figure 6:
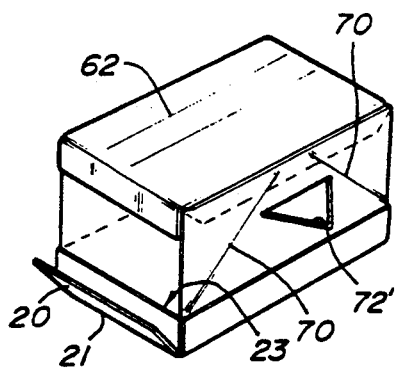
FIG. 6 is a perspective view similar to the perspective view of FIG. 4 showing the top in an overlying position over the side walls and end walls and showing the pivoting flap for disposing of the litter and waste material.

Referring again to FIGS. 3 and 4, and also referring to FIG. 7, the top 48 may include additional panels 50 and 50'. The additional panels 50 and 50' have axes 52 and 52' parallel to the connection 54 between the top 48 and the side walls 28 and 30. The top 48 also includes an outer lip 56 at its free end and includes opposing side flaps 58 and 60. The additional panels 50 and 50' permit the top 48 to be conveniently folded about the base 16 of the litter box 10 when the box is in the closed configuration. The panels 50 and 50' further allow the box 10 to form a flat roof configuration 62 in the first preferred embodiment, as shown in FIG. 6. It should be noted that the box 10 could still form the flat roof configuration 62 without the additional panels 50 and 50', however, it would not be possible to refold the box 10 in the packaged 12 condition.

Figure 2:
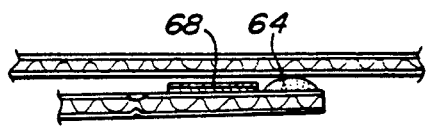
FIG. 2 is a sectional view taken along line 2—2 in FIG. 1 and showing the adhesive securing means of the present invention.
Figure 5:
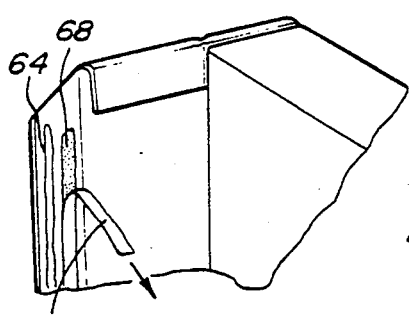
FIG. 5 is a sectional view of the top panel similar to that shown in the perspective view in FIG. 3 and showing the detachable adhesive strip of the adhesive securing means of the present invention.

Referring again to FIGS. 1 through 3, and to FIG. 5, adhesive securing means for securing the litter box 10 in both the packaged and expanded positions is provided. A first adhesive portion 64 is provided and secures an inner face 66 of the outer lip 56 of the top 48 against the base 16 of the litter box 10 when in the packaged configuration. The box may be converted from the unexpanded to expanded configuration upon forcibly overcoming the applied adhesive. This adhesive 64 is preferably provided during the manufacturing/filling process of the box 10.

The adhesive securing means further provides a second adhesive portion 68. The second adhesive portion 68 is preferably covered by a tear-away adhesive strip 69. The adhesive portion 68 is provided in a parallel manner to the adhesive 64 originally applied during the manufacturing stage to secure the packaged condition of the box 10. This second adhesive portion 68 is provided to reseal the litter box assembly 10 in the packaged condition 12 when it is desirable to dispose of the litter box 10.

Referring again to FIG. 4, the top 48 overlies the side walls 28 and 30 and end walls 32 and 34 in such a fashion that the lip 56 frictionally secures to the inner face of the side wall 28. The side flaps 58 and 60 extending from the sides of the top 48 mate with outer faces of the opposing end walls 32 and 34 and assist in providing support for the top and in securing the box in the expanded enclosed position.

Referring again to FIG. 3 and FIG. 7, diagonal folding axes 70 are provided on the end walls 32 and 34 and at least one of the side walls 28 and 30. The folding axes 70 permit the side walls 28 and 30 and end walls 32 and 34 to fold upwards from the unexpanded to the expanded configuration in a speedy and convenient fashion.

In the preferred embodiment of FIGS. 3 and 4, a single diagonal folding axis 70 is provided on each of the end walls 32 and 34. A pair of diagonal folding axes 70 are further provided on at least one of the side walls 28 and 30. The pair of folding axes 70 intersect close to a point at the upper edge of the side wall 28 or 30. Once the side walls and end walls are opened along the folding axes, the top 48 may be conveniently applied in an overlying manner to provide a tight frictional fit to the litter box 10 assembly.

Referring to FIG. 6, at least one of the sides 20-26 of the base 16 may be opened and pivoted about a lower edge thereof. In FIG. 6, side 20 of base 16 is illustrated, and may be pivoted about axis 21. A zip strip or similar means located along axis 23 would enable the panel to be opened. The side may be pivoted to an open position to conveniently facilitate the removal of expired litter and waste material from within the litter box 10 while in the closed position 12 prior to disposing of the box for cardboard recycling.

Referring again to FIGS. 3 and 4, an aperture 72 is provided on at least one of the side walls 28 and 30 and end walls 32 and 34. The aperture 72 permits the animal to both enter and exit the litter box 10 when in the open/expanded configuration. The aperture 72 may be preferably shaped in the form of a trapazoid with a curved or arcuate edge. Alternatively, referring again to FIG. 6, an inverted triangle 72' may be employed for the aperture 72. The embodiment of FIG. 6 is advantageous in that the relatively small cross-sectional area of the opening along the lower portion of the aperture 72' would minimize the animal from kicking litter and accumulated wastes out through the aperture to the external surroundings.

Referring again to FIG. 7 and to FIGS. 8 and 9, a second preferred embodiment of the present invention is provided and includes an additional panel 50" connected to panels 50 and 50', in turn connected to top 48'. The additional panel 50" converts the flat-top configuration 62 of FIGS. 3, 4, and 6 into a peaked roof configuration 74. With respect to a flat roof configuration 62 lacking any panels 50 and 50', a single additional panel 50" could still form the peaked roof 74 of the present invention. The additional height provided the top by virtue of the additional panel 50" is compensated for by increasing the dimensions of the side flaps 58 and 60. The side flaps in this embodiment are provided as separate inner side flaps 58 and 58' and outer side flaps 60 and 60' in order to accommodate the peaked roof 74 and to provide an overlapping enclosure to the sides of the top 48'.

The top 48' of the second preferred embodiment is illustrated in phantom in FIG. 7, in comparison to the top 48 of the first preferred embodiment. The peaked roof 74 is advantageous in that it provides additional headroom for larger animals without necessitating changes in the length or width of the litter box 10.

Having described my invention many modifications thereto will become apparent to those skilled in the art to which it pertains without deviation from the spirit of the invention as defined by the scope of the appended claims.

I claim:

1. A foldable litter box convertible from a closed configuration to an open configuration to form an enclosed receptacle, said foldable litter box comprising:
   a base;
   side walls extending from said base;
   end walls extending from said base and perpendicular to said side walls, said side walls and said end walls being connected to one another in alternating fashion along common boundaries, said side walls and said end walls being of the same height;
   diagonal folding axes provided on said end walls and on at least one of said side walls, said diagonal folding axes permitting said litter box to convert from said closed to said open position;
   a top connected to one of said side walls, said top overlying said side walls and said end walls to form a flat roof; and
   an aperture in at least one of said side walls and said end walls for permitting access to within said receptacle.

2. The litter box as defined in claim 1, wherein said enclosed receptacle is of a one-piece construction and has a generally rectangular configuration.

3. The litter box as defined in claim 1, further comprising a waste absorbent material disposed in said litter box.

4. The litter box as defined in claim 1, wherein said diagonal folding axes comprise a single said folding axis on each of said end walls and a pair of said folding axes on said at least one of said side walls.

5. The litter box as defined in claim 1, further comprising an outer flap attached to a free end of said top opposite said connection between said top and said one of said side walls, said outer flap having an adhesive applied to an inner face of said outer flap, said adhesive securing said litter box in said closed configuration.

6. The litter box as defined in claim 5, further comprising a tear-away adhesive strip placed alongside said applied adhesive, said tear-away strip resecuring said litter box in said closed configuration upon disposal thereof.

7. The litter box as defined in claim 1, further comprising means for disposing said waste absorbent material from said litter box.

8. The litter box as defined in claim 7, wherein said base has four sides corresponding to the connection of said base to said side walls and said end walls, at least one said side of said base may be pivoted along an edge thereof to permit emptying of said waste absorbent material from said litter box.

9. The litter box as defined in claim 1, wherein said top is foldable about a line extending substantially horizontally between said end walls.

10. The litter box as defined in claim 1, wherein said aperture is a substantially inverted triangle.

11. The litter box as defined in claim 1, wherein said aperture is a substantially trapezoid shape with an acurate edge.

12. The litter box as defined in claim 1 having a handle to transport said litter box.

13. A foldable litter box convertible from a closed configuration to an open configuration to form an enclosed receptacle, said foldable litter box comprising:
   a base;
   side walls extending from said base;
   end walls extending from said base and perpendicular to said side walls, said side walls and said end walls being connected to one another in alternating fashion along common boundaries, said side walls and said end walls being of the same height;
   diagonal folding axes provided on said end walls and on at least one of said side walls, said diagonal folding axes permitting said litter box to convert from said closed to said open position;
   a top connected to one of said side walls, said top overlying said side walls and said end walls;

said top including at least one panel connected to said top, the connection between said at least one panel and said top being a folding axis, said top and said at least one panel forming a peaked roof when said top is in said overlying position; and an aperture in at least one of said side walls and said end walls for permitting access to within said receptacle.

14. The litter box as defined in claim 13, wherein said enclosed receptacle is of a one-piece construction and has a generally rectangular configuration.

15. The litter box as defined in claim 13, further comprising a waste absorbent material disposed in said litter box.

16. The litter box as defined in claim 13, wherein said diagonal folding axes comprise a single said folding axis on each of said end walls and a pair of said folding axes on said at least one of said side walls.

17. The litter box as defined in claim 13 further comprising a lip attached to a free end of said top opposite said connecton between said top and said one of said side walls, said lip having an adhesive applied to an inner face of said lip, said adhesive securing said litter box in said closed configuration.

18. The litter box as defined in claim 17, further comprising a tear-away adhesive strip placed alongside said applied adhesive, said tear-away strip resecuring said litter box in said closed configuration upon disposal thereof.

19. The litter box as defined in claim 13, further comprising means for disposing said waste absorbent material from said litter box.

20. The litter box as defined in claim 19, wherein said base has four sides corresponding to the connection to said side walls and said end walls, at least one said side of said base may be pivoted along an edge thereof to permit emptying of said waste absorbent material from said litter box.

21. The litter box as defined in claim 13, wherein said top is foldable about a line extending substantially horizontally between said end walls.

22. The litter box as defined in claim 13, wherein said aperture is a substantially inverted triangle.

23. The litter box as defined in claim 13, wherein said aperture is a substantially trapezoid shape with an arcuate edge.

24. The litter box as defined in claim 13, having a handle to transport said litter box.

* * * * *

UNITED STATES PATENT AND TRADEMARK OFFICE
CERTIFICATE OF CORRECTION

PATENT NO. : 5,211,134
DATED : May 18, 1993
INVENTOR(S) : Robert T. Bolo, III

It is certified that error appears in the above-identified patent and that said Letters Patent is hereby corrected as shown below:

Column 1, line 6, delete "abandon" and insert --abandoned--.

Column 1, line 59, after "3" insert --)--, delete ":", and insert --;--.

Column 2, line 15, after "Braddock" insert --,--.

Column 5, line 54, after "invention" insert --,--.

Column 6, lines 49-50, delete "acurate" and insert --arcuate--.

Signed and Sealed this

Twenty-fifth Day of October, 1994

Attest:

BRUCE LEHMAN

*Attesting Officer*          *Commissioner of Patents and Trademarks*